United States Patent [19]

Goguen

[11] Patent Number: 5,261,791
[45] Date of Patent: Nov. 16, 1993

[54] METHOD AND APPARATUS FOR RECOVERING POLLUTANTS FROM AN AQUIFER

[75] Inventor: Robin A. Goguen, Fitchburg, Mass.

[73] Assignee: Advanced Remediation Technologies, New Ipswich, N.H.

[21] Appl. No.: 14,142

[22] Filed: Feb. 19, 1993

Related U.S. Application Data

[63] Continuation-in-part of Ser. No. 848,708, Mar. 9, 1992, abandoned.

[51] Int. Cl.⁵ ...................... F04B 35/00; F04B 41/06
[52] U.S. Cl. .......................................... 417/2; 417/41; 417/46; 417/53; 417/282; 417/283; 417/392; 210/104; 210/740; 210/776
[58] Field of Search ................ 417/2, 36, 41, 46, 53, 417/282, 283, 392; 210/104, 740, 776

[56] References Cited

U.S. PATENT DOCUMENTS

| | | | |
|---|---|---|---|
| 1,797,533 | 3/1931 | Stokes . | |
| 2,810,351 | 10/1957 | Bower . | |
| 3,218,979 | 11/1965 | Baldwin . | |
| 3,253,549 | 7/1964 | Vincent et al. . | |
| 3,692,433 | 9/1972 | Finger | 417/382 |
| 4,008,008 | 2/1977 | Vergnet | 417/385 |
| 4,222,440 | 9/1980 | Parker | 166/314 |
| 4,273,650 | 6/1981 | Solomon | 210/104 |
| 4,389,737 | 6/1983 | Robinson et al. | 417/383 |
| 4,497,370 | 2/1985 | Breslin | 166/372 |
| 4,527,633 | 7/1985 | McLaughlin et al. | 166/370 |
| 4,546,830 | 10/1985 | McLaughlin et al. | 166/370 |
| 4,580,952 | 4/1986 | Eberle | 417/383 |
| 4,585,060 | 4/1986 | Bernardin et al. | 166/64 |
| 4,625,807 | 12/1986 | Harlow | 210/104 |
| 4,663,037 | 5/1987 | Breslin | 210/170 |
| 4,678,040 | 7/1987 | McLaughlin et al. | 166/370 |
| 4,727,936 | 3/1988 | Mioduszewski et al. | 166/53 |
| 4,747,451 | 5/1988 | Adams, Jr. et al. | 166/53 |
| 4,826,406 | 5/1989 | Wells | 417/120 |
| 4,934,458 | 6/1990 | Warburton et al. | 166/370 |
| 4,975,027 | 12/1990 | Halverson | 417/392 |
| 4,998,585 | 3/1991 | Newcomer et al. | 166/105 |
| 5,141,404 | 8/1992 | Newcomer et al. | 166/105 |
| 5,147,184 | 9/1992 | Newcomer et al. | 417/394 |
| 5,147,185 | 9/1992 | Niehaus et al. | 417/394 |

FOREIGN PATENT DOCUMENTS

WO87/05974 10/1987 PCT Int'l Appl. .
2184791 7/1987 United Kingdom .

Primary Examiner—Richard A. Bertsch
Assistant Examiner—David W. Scheuermann
Attorney, Agent, or Firm—George A. Herbster

[57] ABSTRACT

Pumping apparatus for recovering a first liquid, such as a pollutant, floating on a second liquid, such as ground water. A pump immersed in the second liquid, or ground water, operates to produce a cone of depression and discharge the second liquid into a pressure vessel. A variable volume chamber inside the pressure vessel contracts and displaces any contents through an outlet conduit to a product discharge point. When the pump turns off, the variable volume chamber expands and draws product into the chamber to be driven from the chamber during successive pumping operations. Over time periodic pumping operations cause the variable volume chamber to recover the first liquid and move it to a discharge point.

38 Claims, 7 Drawing Sheets

METHOD AND APPARATUS FOR RECOVERING POLLUTANTS FROM AN AQUIFER

CROSS REFERENCE TO RELATED APPLICATION

This application is a continuation-in-part of my co-pending application Ser. No. 07/848,708 filed Mar. 9, 1992 now abandoned for a Method and Apparatus for Recovering Pollutants from an Aquifer.

BACKGROUND OF THE INVENTION

1. Field of the Invention

This invention generally relates to pumping systems. More specifically this invention relates to pumping systems for removing a first liquid, such as spilled hydrocarbons, from the surface of a second liquid, such as ground water.

2. Description of Related Art

When hydrocarbons or similar polluting substances spill, they can seep into the ground. Such pollutants have a lower specific gravity than water and generally are immiscible in water. Consequently, they accumulate or float on the surface of the ground water as they permeate the ground and contaminate the surrounding aquifer. Existing recovery apparatus uses different techniques for recovering such pollutants from ground water. Generally these techniques rely on different physical and chemical properties of the ground water and pollutants.

One such technique, called "skimming", relies on the different specific gravities of the ground water and pollutants and the immiscibility of the two liquids.

The skimming process generally includes the drilling of one or more wells. Each well provides access to the ground water and pollutants that accumulate in the well to facilitate the removal of the pollutants. The removed pollutant may be processed on site or stored in containers for removal to an authorized disposal site. It is important that the cleanup apparatus discriminate the pollutant and noncontaminated ground water to minimize the storage or processing requirements of materials recovered as pollutants.

The cleanup process may also include ground water processing particularly as a condition precedent to returning ground water to the aquifer. As such processing may include aerating or filtering steps, it also is important that the apparatus discriminate ground water from pollutants to assure that materials processed as ground water are essentially pollutant free.

The following patents disclose two embodiments of recovery apparatus used in such skimming procedures:

| | |
|---|---|
| 4,497,370 | (1985) Breslin |
| 4,663,037 | (1987) Breslin |

The Breslin (370) patent discloses recovery apparatus that utilizes a hollow housing covered by a semi-permeable membrane. The membrane passes liquid hydrocarbons, but blocks the flow of ground water into the housing. The liquid hydrocarbons then can be moved to a receptacle by suction applied to the housing, by pressurization of the well casing or using submersible pumps.

In accordance with the Breslin (037) patent a recovery unit lowered into a well sinks in the hydrocarbons, but floats in the ground water. A remote pumping facility sucks the hydrocarbons out of the well through an inlet port located in the hydrocarbon layer.

Both of these approaches can be effective for significant layers of hydrocarbons. However each relies on the natural migration of the hydrocarbons to the well site, so once the pumping system extracts the hydrocarbons around the well, a significant time may result before additional hydrocarbons migrate to the well site. Moreover, as the hydrocarbon layer becomes thin, it becomes difficult for the recovery system to discriminate hydrocarbons and ground water.

Other recovery apparatus decreases recovery time by locating a pump in a well to form a cone of depression, as described in the following patents:

| | |
|---|---|
| 4,273,650 | (1981) Solomon |
| 4,527,633 | (1985) McLaughlin et al |
| 4,546,830 | (1985) McLaughlin et al |
| 4,625,807 | (1986) Harlow |
| 4,826,406 | (1989) Wells |
| 4,934,458 | (1990) Warburton et al |

In each of these references pumping apparatus extracts ground water from the well thereby lowering the ground water level in and proximate the well. Lowering the ground water level accelerates the influx of the pollutant and facilitates the skimming operation. Characteristically recovery apparatus that produces a cone of depression uses one pumping structure for pumping the ground water and another, independent pumping structure for removing the pollutants.

In the Solomon patent, for example, a pump in the bottom of a well ejects ground water from the well to form the cone of depression. A second pumping system periodically pumps the material that accumulates in the cone of depression to a recovery tank or similar structure.

The McLaughlin et al patents utilize independent compressed air pumping systems for forming the cone of depression and for removing the pollutants respectively. Compressed air pumping systems avoid the potential for fire that could occur if electrical motors are located in or proximate hydrocarbons.

The Harlow patent discloses a pump for forming a cone of depression. Compressed air from an external source moves the pollutant by driving a piston pump.

The Wells patent discloses a submersible system with an open top sleeve that extends above the pump system for skimming the upper portion of any liquid collected in a cone of depression. An independent compressed air pump forces skimmed materials to a recovery system.

The Warburton patent also discloses a system for producing a cone of depression with separate electrical pumping systems submerged in the ground water. A long hose extends from the pollutant pump to the cone. It is necessary to adjust the entrance of the hose to lie in the accumulated hydrocarbons.

Other pumping systems that pump one liquid separately from another liquid often include separate variable volume chambers as shown in the following references:

| | |
|---|---|
| 1,797,533 | (1931) Stokes |
| 3,218,979 | (1965) Baldwin |
| 3,692,433 | (1972) Finger |
| 4,389,737 | (1983) Robinson et al |
| 2,184,791 | (1987) Hoya (Great Britain) |

| | |
|---|---|
| 4,975,027 | (1990) Halverson et al |

The Stokes patent discloses an expansible chamber utilized in conjunction with a flash steam generator for pumping water. The Baldwin and Robinson patents disclose blood pumps in which one liquid, such as a hydraulic liquid or saline solution, changes a pumping volume to displace blood. The Finger patent discloses a piston pump with input and output conduits. A parallel system damps pressure variations induced by piston action. In accordance with the Hoya patent, a pump for displacing a slurry, as one liquid, operates in response to hydraulic fluid, as a second liquid, acting on a reciprocating piston to change the volume of a slurry pumping chamber. The Halverson et al patent discloses a transfer pump with a piston and a bellows. The pump is adapted for use in vacuum applications.

Other patents that disclose apparatus with variable volume pumping chambers for lifting liquids from deep wells, include:

| | |
|---|---|
| 2,810,353 | (1957) Bower |
| 3,253,549 | (1966) Vincent et al |
| 4,008,008 | (1977) Vergnet |
| 4,222,440 | (1980) Parker |
| 4,580,952 | (1986) Eberle |
| WO 87/05974 | (1987) Dickinson et al |

The Bower patent discloses a flexible bladder for pumping liquid from a well. A torsion rod twists to contract the bladder and pump any contents therefrom. Releasing the torsion rod allows the bladder to fill with oil.

In the Vincent et al patent, a power fluid operates on a reciprocating plunger acting through a pipe on a liquid to expand and contract a bladder alternately thereby to pump another liquid from a well to a surface.

The Vergnet patent discloses a reciprocating piston that acts through a long tube to contract and expand a bladder. The bladder is located in a fixed housing with inlet and outlet valve structures and pumps liquid into and out of the housing thereby to force a liquid from a well.

In the Parker patent pumping apparatus includes inverted inner and outer cups. The outer cup connects to atmosphere via capillary tube while the inner cup is a closed dome. Liquid passes through a check valve in the bottom of the outer cup to rise in the closed dome. When the capillary is pressurized from above a well, the check valve closes and the pressure in the outer cup causes liquid to rise in the dome and compress the air trapped in the dome. When the capillary is suddenly opened to atmospheric pressure, the entrapped compressed air drives the fluid in the first cup through the capillary.

In the Eberle patent a hydraulic pump alternately expands and contracts a bladder in a chamber with inlet and outlet valve structures.

In the Dickinson et al patent a bladder pump, suspended in a tubular airlift pump housing, responds to pressure variations of compressed air to expand and contract the bladder.

Variable volume pumping systems using bladder-type pumps like those described above have not been used in recovery systems for skimming pollutants from ground water. First, prior art bladder-type pumps have not produced flow rates that are sufficient to form a cone of depression in many applications. Thus, the need for a high flow rate ground water pumping systems remains. The use of these pumping systems as pollutant pumps might seem appropriate. However, these prior art bladder systems require additional structures for expanding and contracting a bladder. The resulting increase in apparatus and operating costs and complexity and potential decrease in apparatus reliably over the existing two-pump recovery apparatus is not justified.

Cone of depression recovery apparatus with independent pumping systems have certain characteristic limitations. For example, the requirement for a second pumping system increases the overall manufacturing costs of the recovery apparatus. Such apparatus also requires complex control systems to assure that the materials pumped by each pumping system are product and ground water, respectively. If a risk of fire and explosion in the event of an electrical fault is of paramount concern, pneumatic pumping systems are selected with their attendant air compressors. However, air compressor motors must be much larger than electrically-operated pump motors for equal performance. Moreover, pneumatically-operated pumps require filters, driers and other apparatus to provide a clean, dry source of air. Thus, pneumatic systems are costly, electrically inefficient and difficult to maintain. Nevertheless, existing cone of depression recovery apparatus continues to utilize both electrically and pneumatically independent dual pumping systems for pumping ground water and recovered pollutants.

SUMMARY

Therefore it is an object of this invention to provide improved apparatus for recovering products, such as pollutants, from the surface of a medium, such as ground water.

Another object of this invention is to provide apparatus for recovering a product floating on a medium that incorporates a single externally-powered pump.

Still another object of this invention is to provide apparatus for recovering a product floating on a medium that includes means for pumping the product independently of the medium.

Still another object of this invention is to provide apparatus for recovering a product floating on a medium adapted to produce cones of depression in which pumping of the product occurs independently of an electrical or pneumatically-operated pump.

Yet another object of this invention is to provide apparatus for recovering a product floating on a medium that operates efficiently.

Still yet another object of this invention is to provide apparatus for recovering a product floating on the surface of a medium that is more reliable and less costly than prior art apparatus.

In accordance with one aspect of this invention, a method for removing a first liquid floating on a second liquid includes the step of positioning a pump in the second liquid. Energizing this pump discharges the second liquid under pressure through a discharge path and depresses the second liquid from an upper to a lower level. When the second liquid reaches the lower level, the pump stops and the pressure in the discharge path drops. A variable volume chamber contracts and expands in response to pressure variations in the discharge path. Another path extends from the first liquid to a discharge point through the variable volume chamber, so the pressure variations in the discharge path and attendant alternating contractions and expansions of the variable volume chamber pump the first liquid to the discharge point.

In accordance with another aspect of this invention, the apparatus for pumping a product floating on a medium to a product discharge point includes a discharge chamber for conveying the medium to a medium discharge point and a pumping means with an inlet located in the medium and an outlet connected to the discharge chamber for periodically pumping the medium into the chamber under pressure. A product conduit conveys product floating on the medium to the product discharge point and passes through a variable volume chamber. Periodic operation of the pumping means alternately contracts and expands the variable volume chamber thereby to transport product to the product discharge point.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
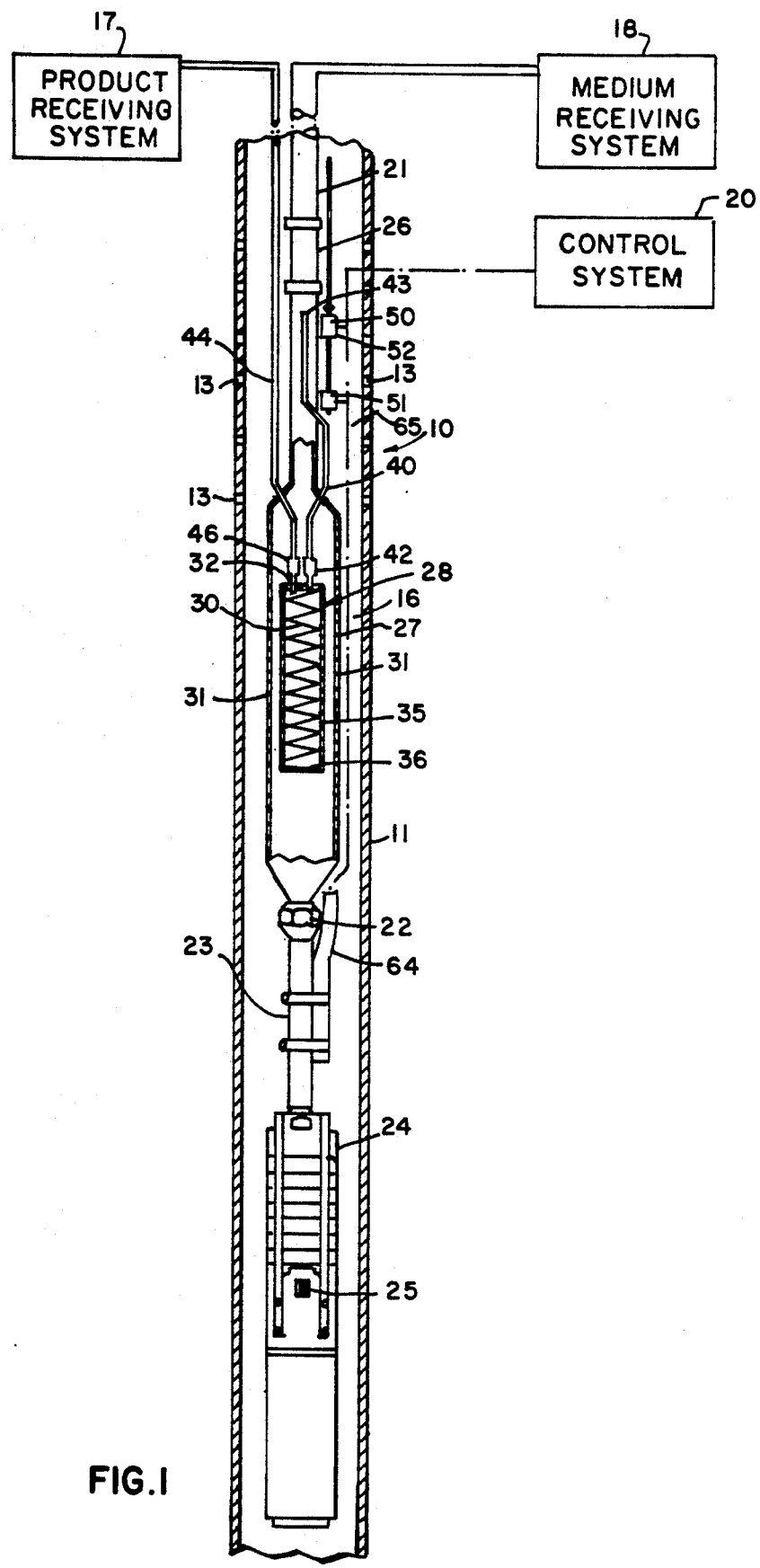
FIG. 1 is a view, partially in schematic and partially in cross-section of apparatus constructed in accordance with this invention.

In a typical recovery operation for a spilled pollutant the first step is drilling one or more wells into the ground near the spill site. One such well 10 is shown in each of FIGS. 1 and 2A through 2D and includes a well casing 11 that keeps the surrounding ground 12 from collapsing into the well 10. Apertures 13 in the well casing 11 admit ground water 14 and the pollutant 15 to fill and accumulate within the well casing 11. Recovery apparatus 16, constructed in accordance with this invention, pumps the pollutants or product 15 to a product receiving system 17 and pumps the ground water 14 to a medium receiving system 18. A control system 20 monitors conditions in the well and controls the apparatus as will be described.

The product receiving system 17 may take different forms. In a simple embodiment it may comprise a structure for filling tanks with the product. A complex embodiment could include chemical processing apparatus. Similarly, the ground water, or medium receiving, system 18 could comprise filters and aerators. As the specific details of such receiving systems are not necessary for an understanding of this invention, these systems are depicted in a block form.

In the following discussion it will become apparent that this apparatus can be used in applications that do not include the specific recovery of pollutants from ground water. For that reason in the following description, the term "medium" is meant to include ground water as a first liquid of a given specific gravity; the term "product", to include hydrocarbons or other pollutants as a second liquid having a lower specific gravity than the medium and being immiscible in the medium.

Referring to FIG. 1 a ground water discharge pipe 21 extends vertically axially in the apparatus of FIG. 1 to a coupling 22 that receives an output pipe 23 from a submersible pump 24. The control system 20 energizes the pump 24 to pump ground water, as the medium, from an inlet 25 up through the discharge pipe 21. When the pump 24 turns off, a check valve 26 in the discharge pipe 21 prevents any back flow of liquid in the pipe 21 between the check valve 26 and the medium receiving system 18. Water in the discharge pipe below the check valve 26 drains back through the pump 24 into the well 10. The discharge from the pump 24 fills the pipe 21 including, in this specific embodiment, a pressure vessel 27 that forms a bulbous portion of the discharge pipe 21.

In use a cable typically connects from a winch at ground level to an eye formed on the pump 24. The cable then controls the vertical position of the apparatus 16 in the well 10. As such support structures are well known in the art, no structure is disclosed in this description.

Figure 3:
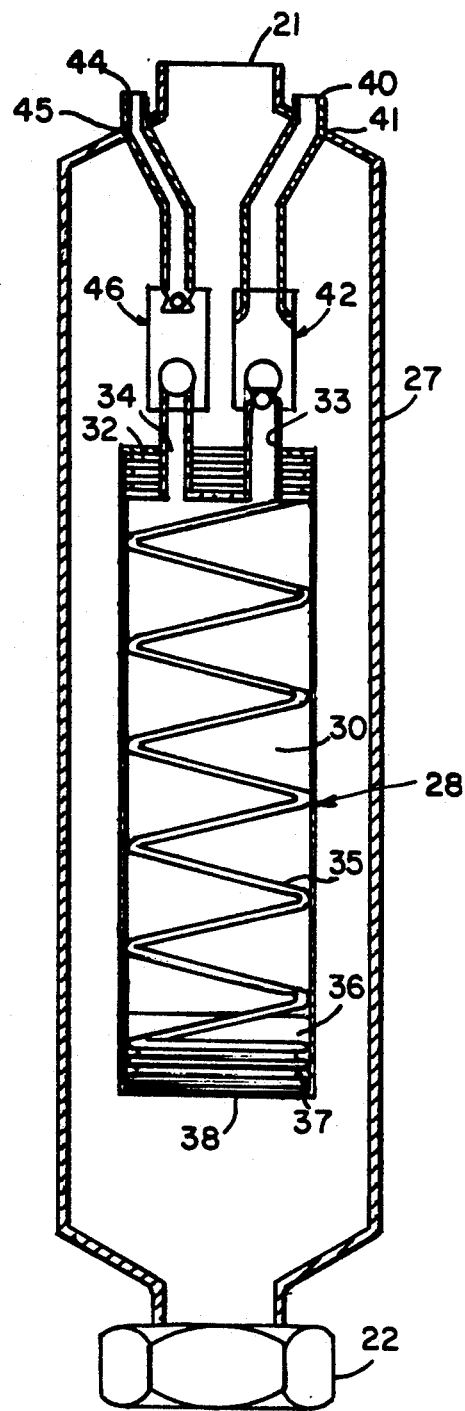
FIG. 3 is a detailed view of a portion of the apparatus shown in FIG. 1.

In the embodiment of FIGS. 1 and 3, the pressure vessel 27 supports a positive displacement pump 28 with a variable volume chamber 30 formed within a cylinder 31 spaced from the walls of the pressure vessel 27. A seal 32 closes the upper end of the cylinder 31 as shown more clearly in FIG. 3, and contains an inlet port 33 and an outlet port 34. A return spring 35 in the cylinder 31 biases a piston 36, including peripheral seals 37, toward an open retaining plate 38. The spring 35 and piston 36 constitute a biased barrier means that slides within the cylinder 31 to vary the variable pumping volume 30 between the piston 36 and the seal 32.

An inlet conduit 40 passes through an aperture 41 formed in the pressure vessel 27 and extends to a one-way check valve 42 connected to the inlet port 33 of the seal 32. The inlet conduit is open at an end 43. An outlet conduit 44 extends through a second aperture 45 formed in the pressure vessel 27 to receive liquid discharged from the cylinder 31 through a check valve 46. Structures for supporting the cylinder 31 in the pressure vessel 27 are well known to those of ordinary skill in the art, so no structure is shown for clarity.

Figure 4:
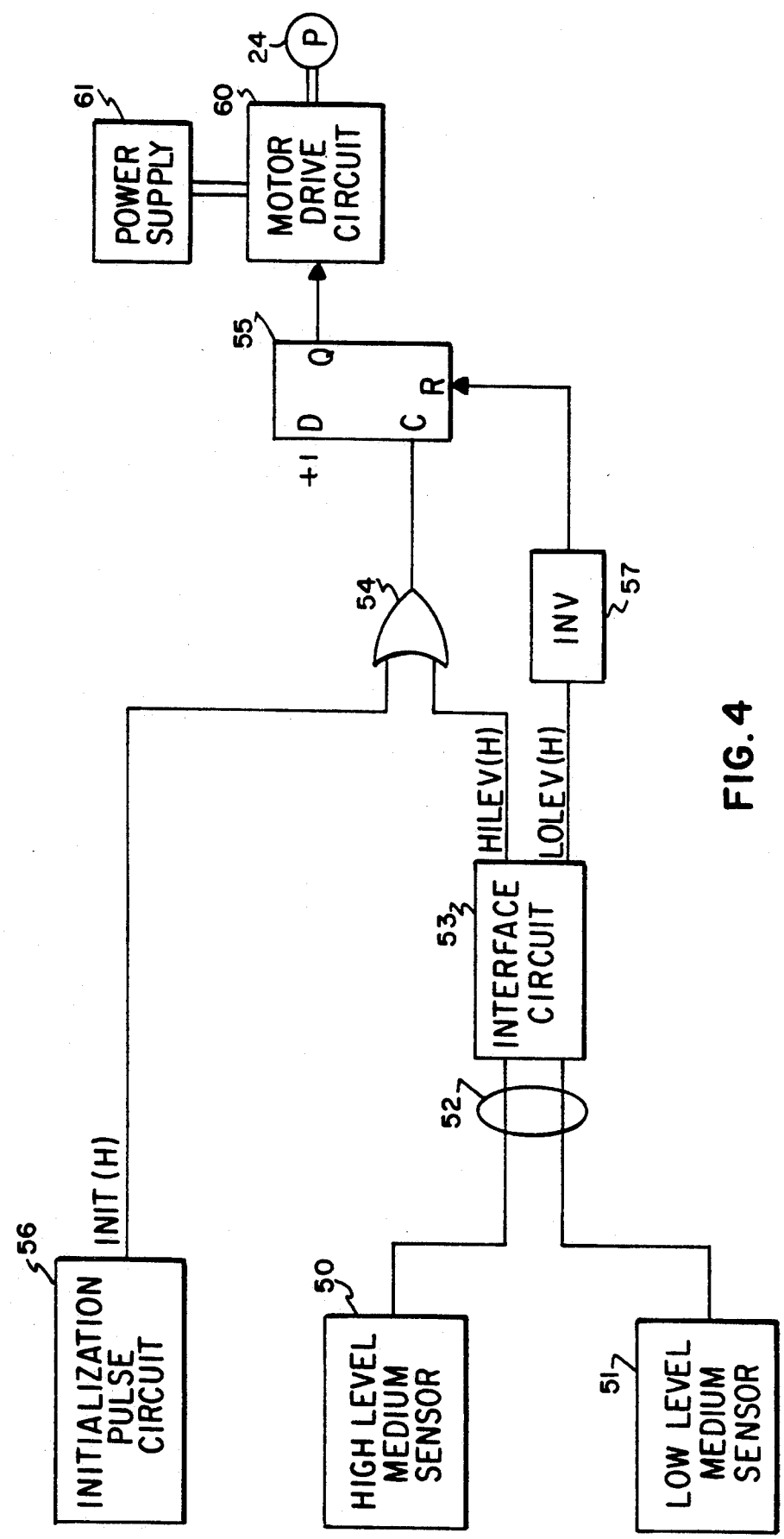
FIG. 4 is a schematic of a portion of a control system useful with the apparatus of FIG. 1.

Referring now to FIGS. 1 and 4, a high-level medium, or ground water, sensor 50 and a low-level medium sensor 51 provide inputs by which the control system 20 turns the pump 24 on and off. Each sensor distinguishes ground water from the pollutant by various means, such as monitoring the specific gravity or conductivity of the liquid contacting the sensor. The high-level sensor 50 and low-level sensor 51 connect by conventional cabling represented by dashed line 52 in FIG. 1 to an interface circuit 53 in FIG. 4. When the ground water 13 reaches the high level medium sensor 50, the interface circuit 53 generates a "HILEV(H)" signal (the designation "(H)" indicating that signal level assumes a positive state when it is asserted or logically true). Likewise the low level medium sensor 51 and the interface circuit 53 produce a "LOLEV(H)" signal whenever the level of ground water 14 drops to the low level medium sensor 51.

An OR gate 54 provides a clocking input to a D-latch 55 or equivalent circuit in response either upon the assertion of the HILEV(H) signal or upon the assertion of an INIT(H) signal from an initialization pulse circuit 56. A resulting positive-going transition from the OR gate 54 clocks the latch 55 to a set condition in the absence of an overriding resetting signal from an inverter 57. When the latch 55 sets, a motor drive circuit 60 couples power from a power supply 61 to the pump 24.

Pumping then continues until the ground water 13 reaches the low level medium sensor 51. When this occurs, the LOLEV(H) signal shifts to a nonasserted state so the inverter 57 produces an overriding resetting signal that resets the latch 55 thereby disabling the motor drive circuit 60. The pump 24 then turns off.

Figure 2D:
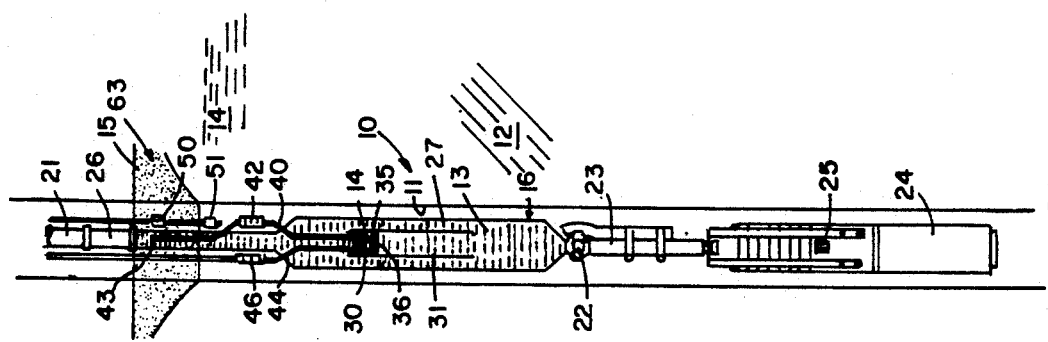
FIGS. 2A through 2D depict a pumping operation in the apparatus shown in FIG. 1.
Figure 2C:
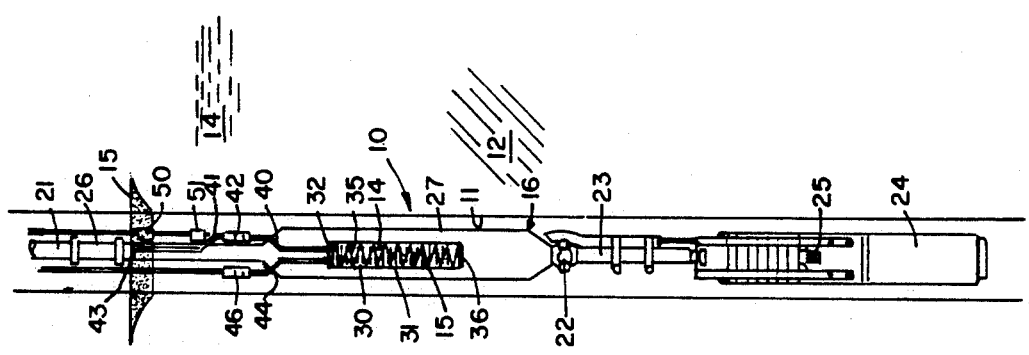
Figure 2B:
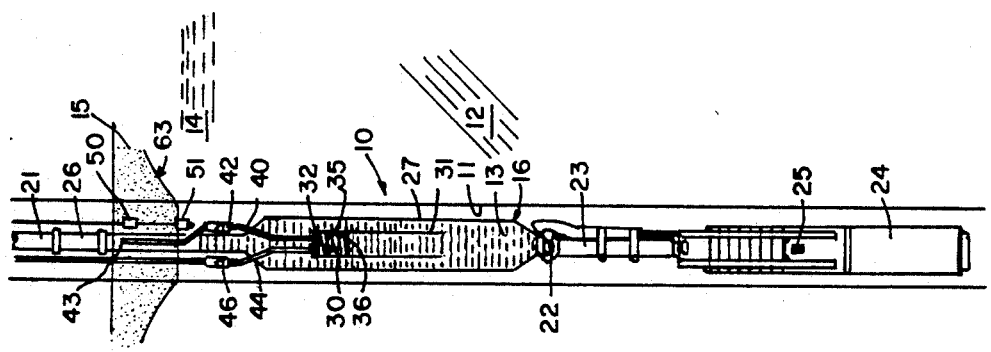
Figure 2A:
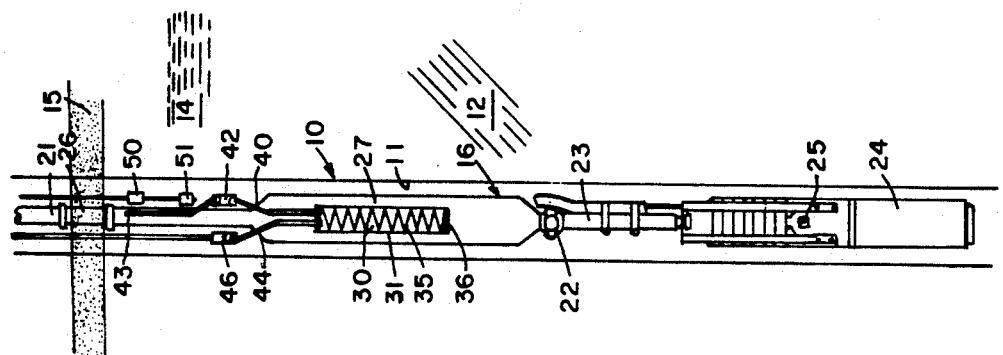

The operation of the apparatus shown in FIG. 1 can best be understood by referring to FIGS. 2A through 2D. When the apparatus 16 is initially installed in a well 10, the pump 24 is off. The vertical position of the apparatus 16 is adjusted by the supporting structure by monitoring the outputs of the high and low level medium sensors 50 and 51. Proper positioning occurs when both are below the product 15. Thus, as shown in FIG. 2A the level of the ground water 14 is above the high level medium sensor 50. When the initialization pulse circuit 56 shown in FIG. 4 is energized, the pump 24 turns on and discharges ground water 14 from the bottom of the well 10 through the pressure vessel 27 and the discharge pipe 21 to the medium receiving system 18 shown in FIG. 1. As previously indicated and shown in FIG. 2B, the pressure in the vessel 27 increases and generates a force that displaces the piston 36 upward within the cylinder 31 thereby decreasing the volume of the chamber 30 and compressing the return spring 35. As the volume of the chamber 30 decreases, the check valve 42 closes and the check valve 46 opens so air or liquid in the chamber 30 exits through the output conduit 44 to the product receiving system 17. When the apparatus initially is energized, the volume 30 normally contains only air that bleeds from the product receiving system 17 in FIG. 1.

As also shown in FIG. 2B, this pumping operation produces a cone of depression 63 as the level of the ground water level lowers. Consequently, the level of the pollutant 15 also lowers and the end 43 of the inlet conduit 40 is in the product 15.

When the level of the ground water 14 reaches the low level medium sensor 51, pumping ceases. As a result, the pressure within the pressure vessel 27 drops. The return spring 35 produces a dominant force that drives the piston 36 from the end seal 32 to the bottom of the cylinder 31 as shown in FIG. 2C. The pumping chamber 30 expands so the check valve 46 closes and the check valve 42 opens. This allows product 15 to enter the end 43 of the inlet conduit 40 and fill the chamber 30. Simultaneously, ground water 14 and pollutants from surrounding areas reach the well so the cone of depression 63 begins to fill and the level of the ground water 14 rises to the high level medium sensor 50. When this occurs the control circuit again energizes the pump 24.

Referring to FIG. 2D, the pump 24 again discharges ground water 14 into the vessel 27 and drives the piston 36 upwardly within the cylinder 31 compressing the return spring 35. The check valve 42 closes and the check valve 46 opens. Now displacement of the piston drives product 15 from the variable volume chamber 30 through the outlet conduit 44 into the product receiving system 17 that is shown in FIG. 1. Still referring to FIG. 2D, the size of the cone of depression 63 increases as the level of the ground water 14 lowers toward the low level medium sensor 51 whereupon the sequence repeats to draw more product 15 into the variable volume chamber 30 as shown in FIG. 2C to begin a periodic pumping operation.

As now will be apparent, the recovery apparatus of this embodiment of the invention contains a single, externally driven pump 24 for forming the cone of depression and a mechanically operated positive displacement pump 28 that operates as the piston 36 reciprocates in the cylinder 31. As the pump 24 is immersed deeply in the ground water as a second liquid or medium, it is relatively easy to connect the pump safely to an electrical power supply through a conduit 64 shown in FIG. 1. As the location of any potential electrical fault is physically remote from flammable materials, the likelihood of such a fault resulting in a fire or explosion is remote.

Typically, the rating of the pump 24 is determined initially by required flow rate, lift capability, flow losses and the availability of a pump with a next higher standard rating. The additional work required to contract and expand the variable volume chamber 30 thereby to provide positive displacement pumping constitutes an incremental load that the pump 24 readily handles.

A review of the operation shown in FIGS. 2B through 2D shows that the level of the ground water 14 is always below the end 43 of the inlet conduit 40. Consequently, during periodic operations, the volume 30 normally receives product 15 only. If all the product 15 is removed, the volume 30 will receive air, and not ground water 14. Moreover, the pump 24 is located remotely to the product 15. Thus assures that the material entering the product receiving system 17 receives only product and that the medium recovery system 18 receives only ground water. Consequently, this eliminates many control components used to assure such operations in prior systems, simplifies the apparatus and improves reliability.

Figure 5:
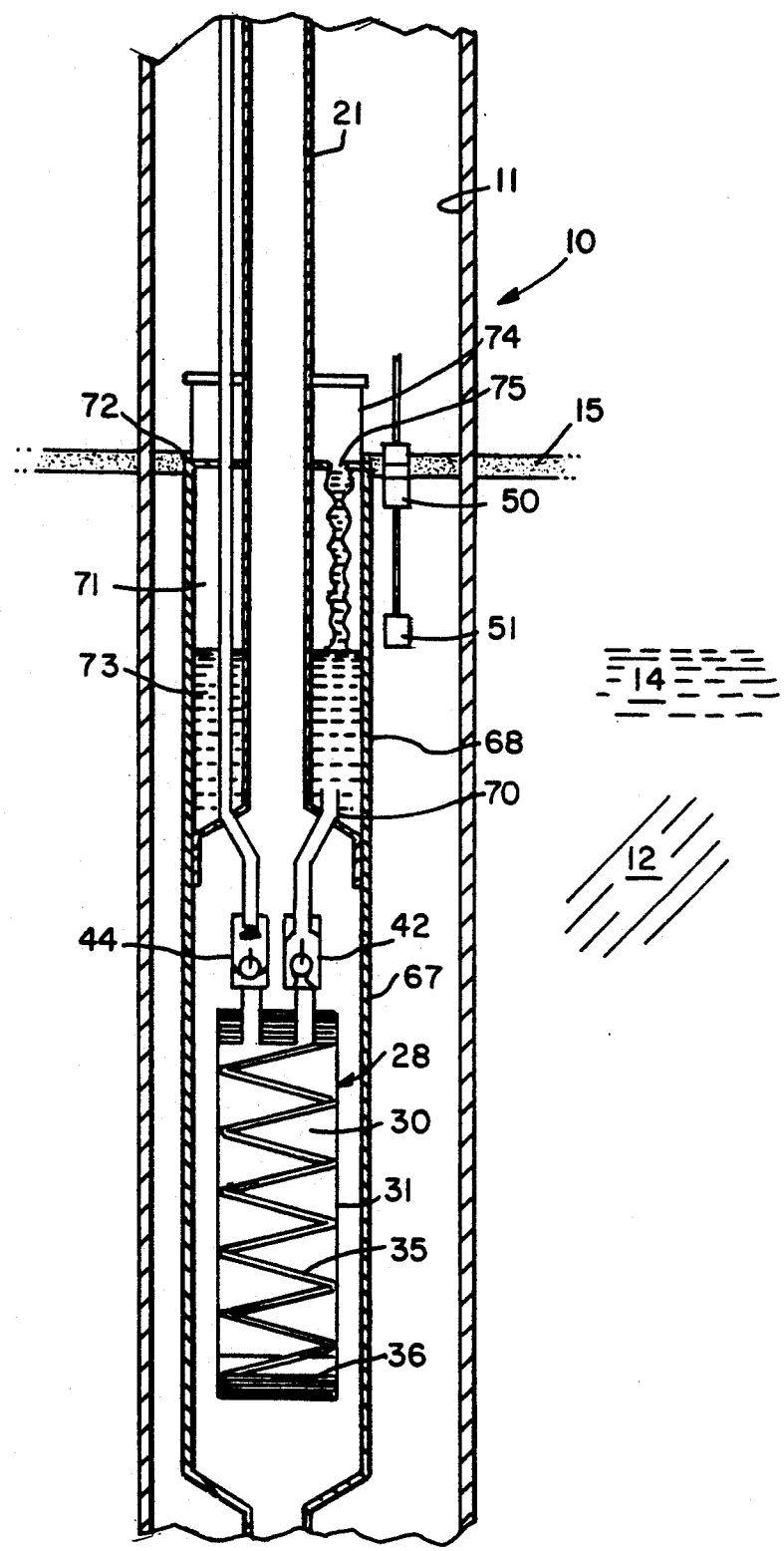
FIG. 5 is a detailed view of a portion of apparatus constructed in accordance with another embodiment of this invention.

FIG. 5 depicts a modification that improves the pumping efficiency of the positive displacement pump 28 shown in FIG. 1 when the product 15 constitutes a thin layer on the ground water 14. When only a thin layer of product 15 is present, the level of the product 15 can fall below the open end 43 of the inlet conduit 40 in FIG. 1 when the cone of depression forms during energizing of the pump 24. In that situation all the product 15 lies below the open end of the inlet 40 when the control system 20 de-energizes the pump. Consequently as the piston 36 moves down in the cylinder 31 and expands the variable volume chamber 30, only air enters the positive displacement pump 28.

In FIG. 5 like reference numerals denote elements that correspond to those shown in FIG. 1 and like FIG. 1 the well casing 11 forms a well 10 in the ground 12. Only a thin layer of product 15 floats on the ground water 14, however. The modification in FIG. 5 improves the pumping efficiency for the positive displacement pump 28 when thin product layers exists. This modification includes a modified pressure vessel 67 that carries the positive displacement pump 28 and a sleeve 68 that extends vertically from the pressure vessel 67. An inlet conduit 70 couples the bottom of an annular reservoir 71 formed between the sleeve 68 and the water discharge pipe 2 to the inlet check valve 42. The sleeve 68 terminates at an upper edge or rim 72 located below the product level 15 that is defined when the ground water level reaches the high level sensor 50. Thus, when the externally driven pump is off, product 15 can flow over the top edge 72 into a pool 73 at the bottom of the reservoir independently of the operation of the positive displacement pump 28.

FIG. 5 also discloses an optional filter 74 with a discharge port 75. If the filter 74 comprises a hydrophobic-/oleophilic membrane, for example, it can minimize the inflow of ground water 14 with the product 15. Such filters can be placed on the edge 72 to discriminate between ground water 14 and product 15 when the product layer is very thin, but are not required if the product layer is somewhat thicker.

In any event, as the level of the ground water 14 rises when the electrical pump is de-energized, the product 15 eventually reaches and flows over the edge 72 to accumulate in the annular reservoir 71. When the ground water 14 reaches the high level sensor 50, the electrically-operated or externally-driven pump again begins to discharge ground water through the discharge pipe 21 to lower the ground water level 14 and the level of the product 15.

When the product 15 falls below the edge 72, no additional product 15 accumulates in the pool 73. Additional product 15, however, flows into the cone of depression formed within the casing 11, so the product layer thickness will increase, particularly within the confines of the well casing 11. When the water level reaches the lower level sensor 51 the pumping action stops. As the piston 36 moves downward in the cylinder 31 under the force generated by the return spring 35, it expands the variable chamber 30 so product 15 can flow from the pool 73 through the inlet conduit 70 and inlet check valve 42 into the variable volume chamber 30. At the same time the level of the ground water and accumulated product 15 rises. When the product 15 reaches the edge 72, it flows into the reservoir 71.

Therefore the modification of FIG. 5 discloses an integral positive displacement pump with a reservoir in an inlet conduit for accumulating product for subsequent transfer through the variable volume chamber 30. This increases the efficiency of the positive displacement pump 28 and is particularly adapted for applications in which the product 15 constitutes a thin layer on the ground water 14.

Figure 6A:
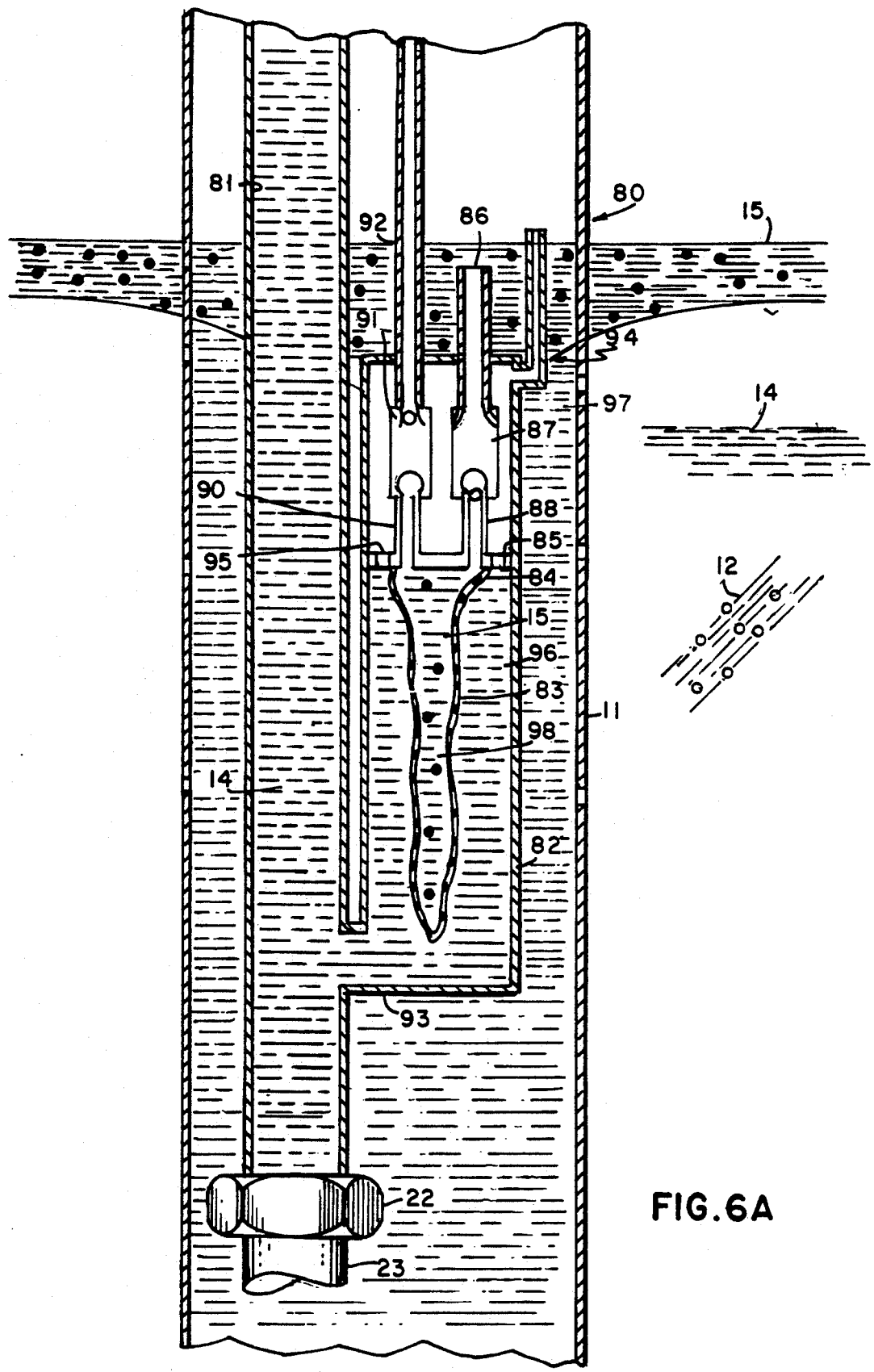
FIGS. 6A and 6B depict an alternate embodiment of a portion of the apparatus shown in FIGS. 1 and 2A through 2D that embodies this invention.
Figure 6B:
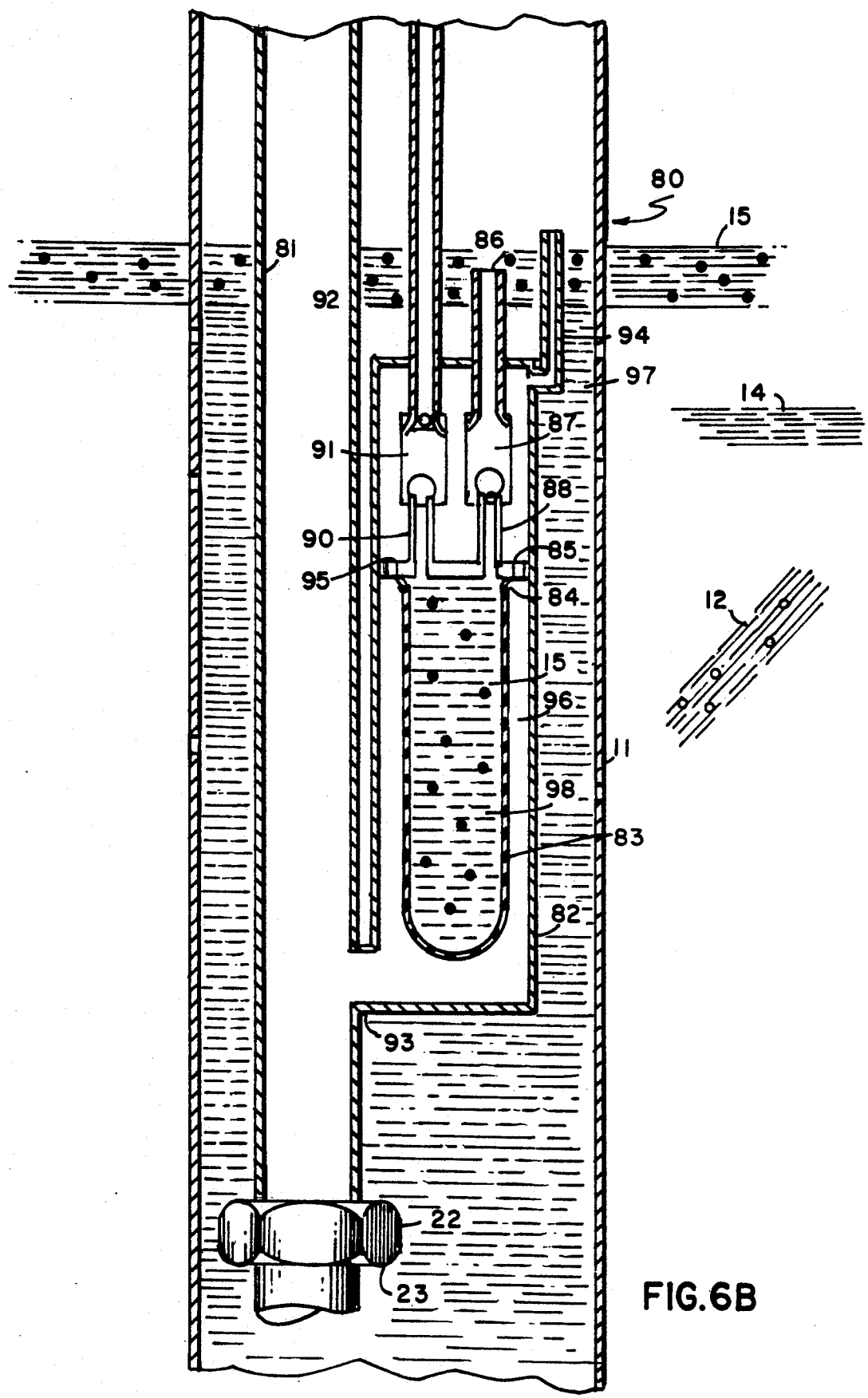

FIGS. 6A and 6B depict another embodiment of this invention that is particularly adapted for applications in which the materials being pumped may subject seals to undue wear. Recovery apparatus 80 of this embodiment may connect through the coupling 22 to the outlet pipe 23 of a pump, such as the main pump 24 in FIG. 1. Like the apparatus in FIG. 1, the recovery apparatus 80 can be disposed within a well casing 11 in the ground 12 with ground water 14 and product 15.

In this embodiment, however, a straight pipe extension 81 extends from the coupling 22 to provide flow through a check valve 26 to apparatus such as the medium receiving system 18 as shown in FIG. 1. The recovery apparatus 80 in FIGS. 6A and 6B additionally includes a cylindrical pressure vessel 82 that is exterior of and parallel to the pipe extension 81. A bladder 83 has an open end 84 attached to a transverse support 85 that, in turn, connects to the pressure vessel 82. The open end 84 receives product through a path including an inlet conduit 86, a one-way or check valve 87 and an input port 88. The bladder 83 discharges product through an outlet port 90, a one-way or check valve 91 and an outlet conduit 92. The outlet conduit 92, like the outlet conduit 44 in FIG. 1, connects to a product receiving system, like the product receiving system 17 in FIG. 1.

As shown in FIGS. 6A and 6B, the pressure vessel 82 connects to the pipe extension 81 through a connector 93. In this embodiment the connector 93 comprises a welded fitting. It is also possible to us standard pipe fittings and the like to produce a detachable connection at the connector 93. FIGS. 6A and 6B also depict optional vents 94 and 95. The vent 94 extends from the pressure vessel 82 to a point above the level of the product 15. The vent 95 communicates between a pressure vessel chamber 96 and an ancillary chamber 97 located oppositely of the transverse support 84. The purpose of these vents will be described later.

The bladder 83 forms a variable pumping volume 98 that lies in the pressure vessel chamber 96 and that is in fluid transfer relationship with the inlet conduit 86 and the outlet conduit 92. Moreover, the bladder is subject to pressure exerted when ground water 14 is being pumped. As specifically shown in FIG. 6A, when the main pump is energized, ground water 14 rises, under pressure, in the pipe extension 81. The ground water 14 also enters the chamber 96 and compresses the bladder 83. The reduces the variable pumping volume 98 to a minimum and expels any product through the outlet conduit 92. If the pressure vessel does not contain the vents 94 and 95, ground water 14 entering the chamber 96 will also compress any air within the chamber 96 until a pressure equilibrium is reached. However, it is still the pressure variation produced by pumping ground water 14 that compresses the bladder 83.

When control circuitry, such as shown in FIG. 4, deenergizes the main pump, ground water drains from the pipe extension 81 and the chamber 96. This produces a pressure gradient from the product 15 to the variable pumping volume 98, so product 15 flows through the inlet conduit 86 to expand and fill the variable pumping volume 98. When the main pump is subsequently energized, the resulting transfer of ground water 14 into the chamber 96 again compresses the bladder 83 and pumps product 15 through the outlet conduit 92.

As previously indicated, the pressure vessel 82 may be vented by structures such as the vents 94 and 95. Venting may be desirable to limit the pressure differentials across the walls of the pressure vessel 82. Such vents might be straight pipes or one-way vents. They might also have metering capabilities.

The embodiment of FIGS. 6A and 6B, like the other embodiments, therefore, includes a discharge chamber in the form of the pipe 81 and the pressure vessel 82 that fills with the medium while it is being pumped to a medium discharge point. A product conduit, including the inlet pipe 86, check valve 87, inlet port 88, outlet port 90, one-way valve 91 and outlet conduit 92, conveys product to a product discharge point. The bladder 83 forms a variable volume pumping chamber that is located in the discharge chamber. As the pump periodically pumps the medium into the discharge chamber, the pressure in the discharge chamber varies and changes the volume of the pumping volume 98. Consequently, periodic pumping causes the variable pumping volume 98 to transport the product from the surface of the medium to the product discharge point.

It will be apparent that each of the embodiments attains all the objectives of this invention. Each apparatus safely uses only a single electrical motor even when recovering hydrocarbons. This system inherently discriminates product, or pollutants, from a medium, such as ground water. The apparatus can connect to a variety of product and medium receiving systems. Moreover, the apparatus eliminates the costs of a second independent electrical or pneumatic pump.

This invention has been disclosed in terms of a three specific embodiments. It will be apparent a number of other alternatives might be employed for the specifically disclosed apparatus with the attainment of some or all of the benefits and advantages of the specifically disclosed apparatus. For example, a single pneumatically-operated pump could be substituted for the pump 24 even although it is less efficient. Still other variable volume chamber structures also exist, and they might be located directly in the flow path for the discharged medium as shown in FIGS. 1 through 5 or in a spaced, chamber as shown in FIGS. 6A and 6B. The arrangement of the various components could be modified. Therefore, it is the intent of the appended claims to cover all such variations and modifications as come within the true spirit and scope of this invention.

What is claimed as new and desired to be secured by Letters Patent of the United States is:

1. Apparatus for pumping a product floating on a medium to a product discharge point, said apparatus comprising:
   A. discharge chamber means for conveying the medium to a medium discharge point,
   B. pumping means having an inlet located in the medium and an outlet connected to said discharge chamber means for periodically pumping the medium into said discharge chamber means under pressure,
   C. product conduit means for conveying product floating on the medium to the product discharge point, and
   D. variable volume chamber means for pumping product through said product conduit means, the volume of said variable volume chamber means being varied in response to pressure fluctuations of the medium in said discharge chamber means whereby periodically operating said pumping means causes said variable volume chamber means to transport the product to the product discharge point.

2. Pumping apparatus as recited in claim 1 wherein said pumping means includes submersible pumping means and control means for periodically energizing said submersible pumping means.

3. Pumping apparatus as recited in claim 2 wherein said control means includes first and second sensor means for generating a signal indicating the presence of the medium at upper and lower levels respectively and pump energizing control means for energizing said submersible pump when the medium is at the upper level and thereafter de-energizing said submersible pump means when the medium falls to the lower level.

4. Pumping apparatus as recited in claim 1 wherein said product conduit means includes inlet and outlet conduit means connected through said discharge chamber means to said variable volume chamber means.

5. Pumping apparatus as recited in claim 4 wherein each of said inlet and outlet conduit means includes a one-way valve means for permitting the transfer of product into and from said variable volume chamber means, respectively.

6. Pumping apparatus as recited in claim 5 wherein said pumping means includes first and second sensor means for generating a signal indicating the presence of the medium at upper and lower levels respectively and wherein said inlet conduit means includes pipe means connected at one end to said inlet conduit one-way valve means, the other end of said pipe means having an opening positioned above said first sensor means.

7. Pumping apparatus as recited in claim 4 additionally including product receiving means and medium receiving means, said outlet conduit means having outlet pipe means with one end connected to said outlet conduit one-way valve means and the other end connected to said product receiving means and said discharge chamber means having pipe means connected to said medium receiving means.

8. Pumping apparatus as recited in claim 7 wherein said pumping means includes first and second sensor means for generating a signal indicating the presence of the medium at upper and lower levels respectively and wherein said inlet conduit means defines a passage between the upper level and said variable volume chamber means for receiving product when the medium is proximate the upper level said outlet conduit means defines a passage for conveying the product from said variable volume chamber means directly to said product receiving means.

9. Pumping apparatus as recited in claim 7 wherein said pumping means includes first and second sensor means for generating a signal indicating the presence of the medium at upper and lower levels respectively and wherein said inlet conduit means includes reservoir means for receiving product when the medium is proximate the upper level and means for conveying the product from said reservoir means to said variable volume chamber means.

10. Pumping apparatus as recited in claim 1 wherein said discharge chamber means and said pumping means are located along an axis and said variable volume chamber means is coaxially located in said discharge chamber means and wherein said pumping means includes submersible pumping means and control means for periodically energizing said submersible pumping means.

11. Pumping apparatus as recited in claim 10 wherein said control means includes first and second sensor means for generating a signal indicating the presence of the medium at upper and lower levels respectively and pump energizing control means for energizing said submersible pump when the medium is at the upper level and thereafter de-energizing said submersible pump means when the medium falls to the lower level.

12. Pumping apparatus as recited in claim 11 wherein said variable volume chamber means includes:
   i. cylinder means with an open end and a closed end, and
   ii. biased barrier means slidable within said cylinder and biased toward said open end thereby to define a variable pumping volume between said barrier means and said closed end, said product conduit means communicating with said variable pumping volume.

13. Pumping apparatus as recited in claim 12 wherein said barrier means includes slidable piston means in said cylinder and spring means for biasing said piston means toward said open end of said cylinder.

14. Pumping apparatus as recited in claim 13 wherein said open end of said cylinder faces said outlet of said pumping means.

15. Pumping apparatus as recited in claim 14 wherein said piston means carries peripheral sealing means intermediate said piston means and said cylinder.

16. Pumping apparatus as recited in claim 12 wherein said product conduit means includes inlet and outlet conduit means connected through said discharge chamber means and said cylinder means to said variable pumping volume.

17. Pumping apparatus as recited in claim 16 wherein each of said inlet and outlet conduit means includes one-way valve means for permitting the transfer of product into and from said variable pumping volume respectively.

18. Pumping apparatus as recited in claim 17 wherein said inlet conduit means includes pipe means connected at one end to said inlet conduit one-way valve means, the other end of said pipe means having an opening positioned above said first sensor means.

19. Pumping apparatus as recited in claim 18 additionally including product receiving means and medium receiving means, said outlet conduit means having outlet pipe means with one end connected to said outlet conduit one-way valve means and the other end connected to said product receiving means and said discharge chamber means having pipe means connected to said medium receiving means.

20. Pumping apparatus as recited in claim 16 wherein said inlet conduit means includes reservoir means for receiving product when the medium is proximate the upper level and means for conveying the product from said reservoir means to said variable volume chamber means.

21. Pumping apparatus as recited in claim 20 wherein said reservoir means includes means forming an annular chamber extending from said discharge chamber means and having an entrance at a level disposed in the product when said pumping means is inactive.

22. Pumping apparatus as recited in claim 21 wherein said outlet conduit means includes one-way valve means for permitting the transfer of product from said variable pumping volume and said conveying means includes one-way valve means for permitting the transfer of product into said variable pumping volume from said reservoir means.

23. Pumping apparatus as recited in claim 1 wherein said discharge chamber means includes a first chamber portion aligned along a first axis with said pumping means, a second chamber portion aligned along a second axis with said variable volume chamber means and a third chamber portion for establishing a passage between said first and second portions.

24. Pumping apparatus as recited in claim 23 wherein said variable volume chamber means includes bladder means with an opening formed therein and means for supporting said bladder means for defining an inner bladder chamber facing said inlet and outlet conduit means, said second discharge chamber portion including means for supporting said bladder means and said inlet and outlet conduit means.

25. Pumping apparatus as recited in claim 24 wherein said pumping means includes submersible pumping means and control means for periodically energizing said submersible pumping means whereby the medium is pumped into the second portion of said discharge chamber means thereby to reduce the volume of said bladder means.

26. Pumping apparatus as recited in claim 25 wherein each of said inlet and outlet conduit means includes one-way valve means for permitting the transfer of product into and from said bladder means respectively.

27. Pumping apparatus as recited in claim 26 wherein said control means includes first and second sensor means for generating a signal indicating the presence of the medium at upper and lower levels respectively and pump energizing control means for energizing said submersible pump when the medium is at the upper level and thereafter de-energizing said submersible pump means when the medium falls to the lower level thereby to reduce the volume of said bladder means when said pumping means is energized and to permit the volume of said bladder means to increase when said pumping means is deenergized.

28. A method for displacing a first liquid floating on a second liquid to a discharge point comprising the steps of:
A. periodically pumping a portion of the second liquid thereby to depress the second liquid from a first to a second level and to produce a pressurized discharge of the second liquid in a discharge path,
B. locating a variable volume chamber means in the discharge path, and
C. establishing a path from the first liquid to the discharge point through said variable volume chamber means whereby pressure variations in the discharge path during said periodic pumping alternately contract and expand the variable volume chamber means thereby to pump the first liquid to the discharge point.

29. A method as recited in claim 28 wherein said periodic pumping reduces the level of the second liquid and includes the steps of monitoring the level of the second liquid, starting said pumping when the second liquid reaches a first level and terminating said pumping when the second liquid reaches a second level.

30. A method as recited in claim 29 wherein said periodic pumping additionally includes the step of restarting said pumping when the second level reaches the first level.

31. A method as recited in claim 29 wherein said step of establishing a path includes the step of accumulating product in a reservoir in the path while the first liquid is proximate the first level, the expansion of the variable volume chamber means moving the first liquid from the reservoir.

32. A method as recited in claim 31 wherein said path establishment step includes the establishment of a one-way flow path for transferring the first liquid from the reservoir to the discharge point.

33. A method as recited in claim 32 wherein said path establishment step includes the establishment of a one-way inlet path for conveying the first liquid to the variable volume chamber means from the reservoir and of a one-way outlet path for conveying the first liquid from the variable volume chamber means to the discharge path.

34. A method apparatus as recited in claim 28 wherein said path establishment step includes the establishment of a one-way flow path for transferring the first liquid to the discharge point.

35. A method as recited in claim 34 wherein said path establishment step includes the establishment of a one-way inlet path for conveying the first liquid to the variable volume chamber means and of a one-way outlet path for conveying the first liquid from the variable volume chamber means to the discharge path.

36. A method as recited in claim 35 wherein said periodic pumping reduces the level of the second liquid and includes the steps of monitoring the level of the second liquid, starting said pumping when the second liquid reaches a first level and terminating said pumping when the second liquid reaches a second level.

37. A method as recited in claim 36 wherein said periodic pumping additionally includes the step of restarting said pumping when the second level reaches the first level.

38. A method as recited in claim 36 including the step of position the entrance to said one way flow path at a position above the first level.

* * * * *